(12) United States Patent
Egloff et al.

(10) Patent No.: US 8,757,634 B2
(45) Date of Patent: Jun. 24, 2014

(54) METALLIC FLAT GASKET

(75) Inventors: Georg Egloff, Weissenhorn (DE); Kurt Hoehe, Langenau (DE); Juergen Schneider, Merklingen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 992 days.

(21) Appl. No.: 12/735,454

(22) PCT Filed: Feb. 5, 2009

(86) PCT No.: PCT/EP2009/000808
§ 371 (c)(1),
(2), (4) Date: Sep. 10, 2010

(87) PCT Pub. No.: WO2009/098063
PCT Pub. Date: Aug. 13, 2009

(65) Prior Publication Data
US 2011/0001295 A1 Jan. 6, 2011

(30) Foreign Application Priority Data
Feb. 6, 2008 (EP) .................................. 08002192

(51) Int. Cl.
*F16J 15/08* (2006.01)
(52) U.S. Cl.
USPC ............................................ 277/594
(58) Field of Classification Search
USPC ................................................ 277/590–596
See application file for complete search history.

(56) References Cited

U.S. PATENT DOCUMENTS

| | | | |
|---|---|---|---|
| 4,105,187 A * | 8/1978 | Huber | 251/334 |
| 4,203,608 A | 5/1980 | Nicholson | |
| 4,372,564 A | 2/1983 | Nicholson | |
| 6,719,301 B2 * | 4/2004 | Chen et al. | 277/601 |
| 7,204,491 B2 | 4/2007 | Hatamura et al. | |
| 8,371,587 B2 * | 2/2013 | Fly et al. | 277/594 |
| 2006/0061045 A1 * | 3/2006 | Burg | 277/593 |
| 2006/0145428 A1 * | 7/2006 | Dudman | 277/626 |
| 2007/0170659 A1 | 7/2007 | Hatamura et al. | |
| 2010/0187771 A1 * | 7/2010 | Waltenberg et al. | 277/595 |

FOREIGN PATENT DOCUMENTS

| | | |
|---|---|---|
| DE | 10 2005 003 017 A1 | 8/2005 |
| EP | 0 358 855 B1 | 5/1992 |
| GB | 2 097 871 A | 11/1982 |

* cited by examiner

*Primary Examiner* — Gilbert Lee
(74) *Attorney, Agent, or Firm* — Marshall & Melhorn, LLC

(57) ABSTRACT

The invention relates to a metallic flat gasket with at least one metallic gasket layer, which is mainly flat and shows a first and second surface, wherein a plane of the gasket runs centered between said flat areas, wherein a camber is formed within the gasket layer, which protrudes over the first surface of the gasket layer and which has a larger length than width, wherein the camber possesses a first level given by a virtual level, which runs in parallel to the plane of the gasket through the foot of the camber on the first surface of the gasket layer and a second level, given by a further virtual, which runs through the highest point of the camber and also parallel to the plane of the gasket of the gasket layer, wherein the camber possesses a slope area that ascends between the two levels. The slope area is provided with an undulating structure such that it comprises at least two waves each with a wave crest and a wave trough.

24 Claims, 14 Drawing Sheets

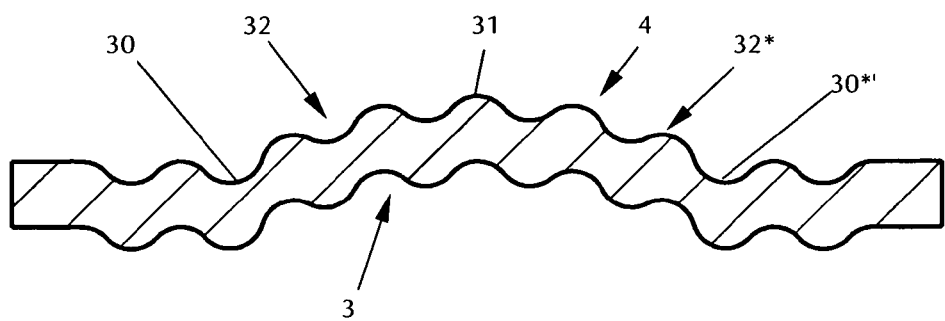
Fig. 10
Fig. 11
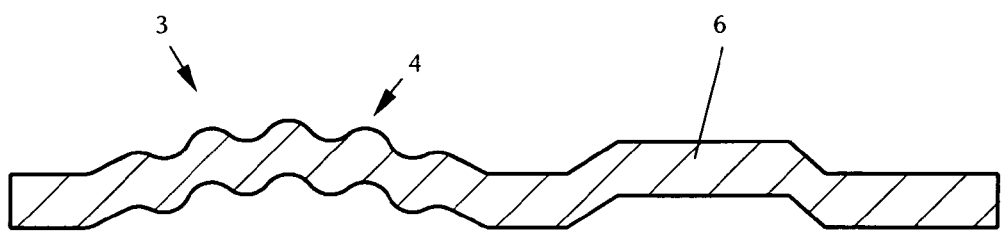

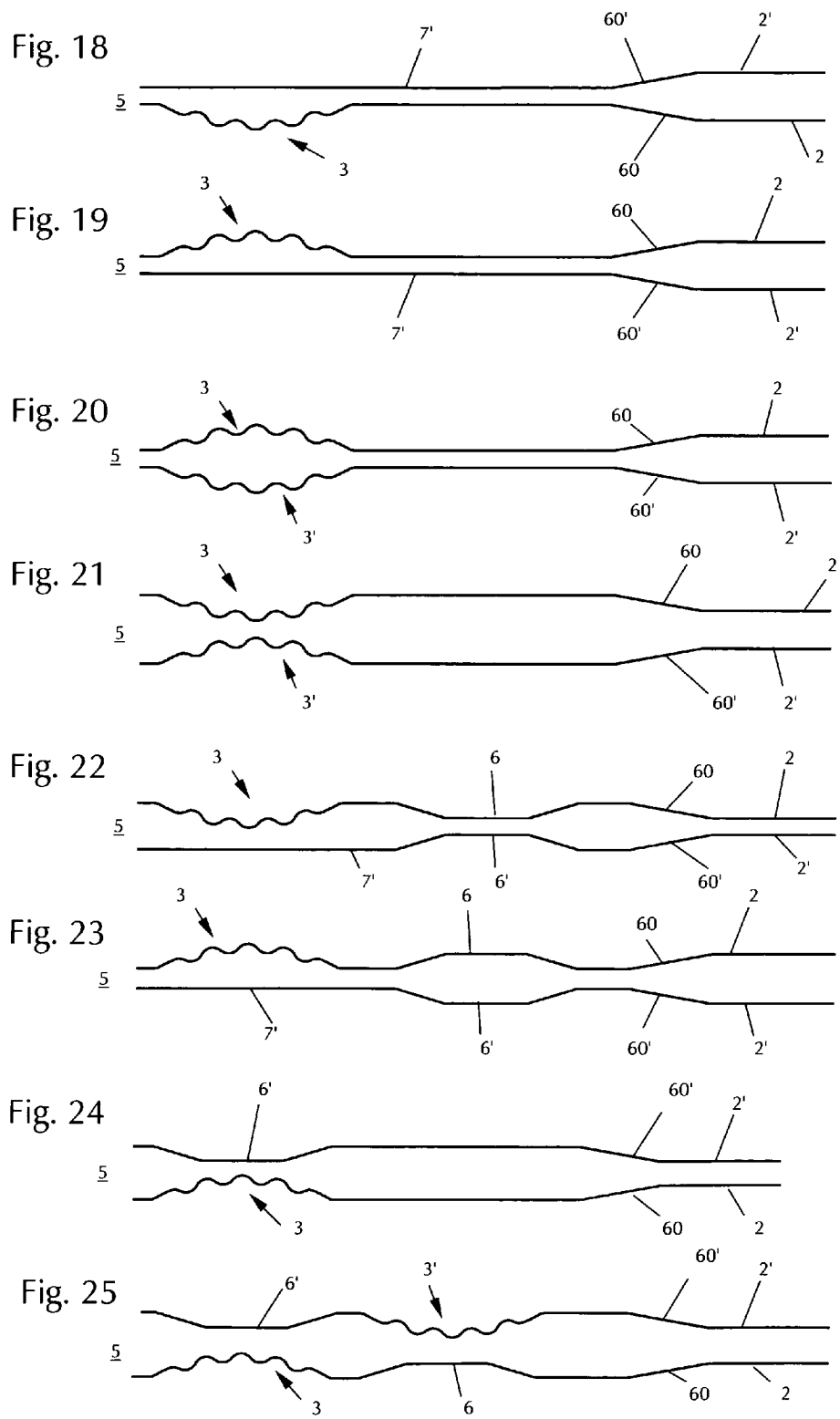

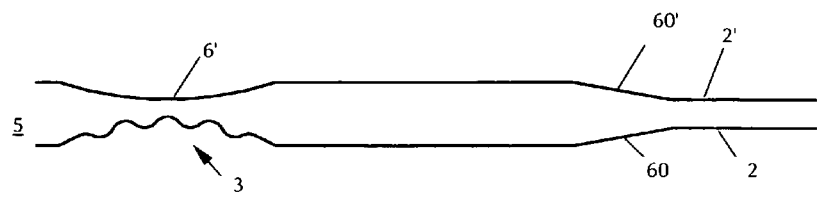
Fig. 26
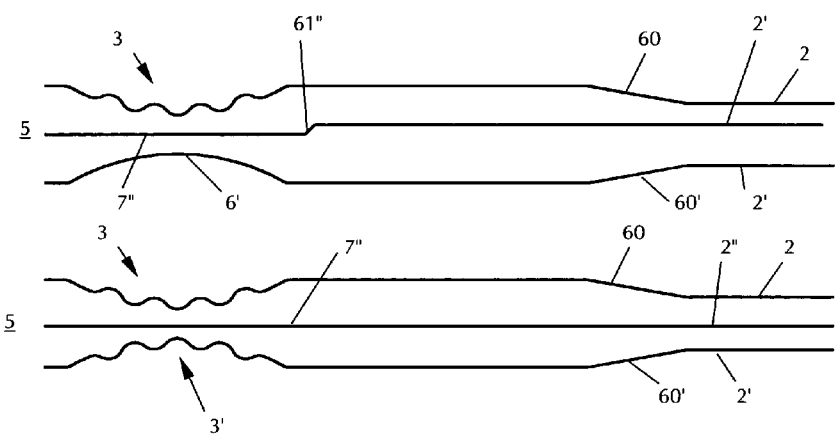
Fig. 27
Fig. 28
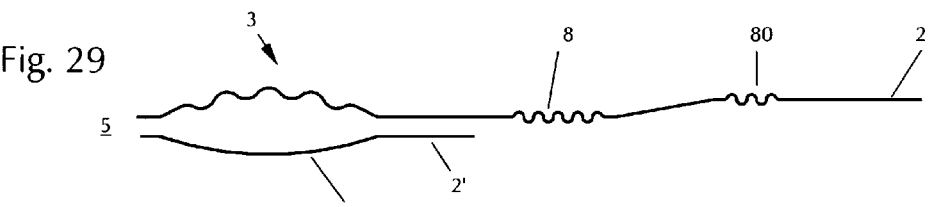
Fig. 29
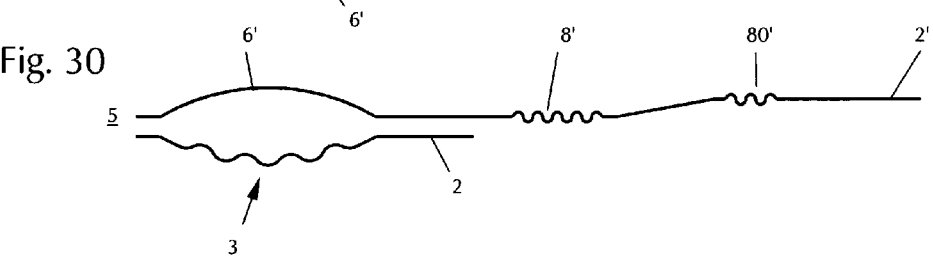
Fig. 30
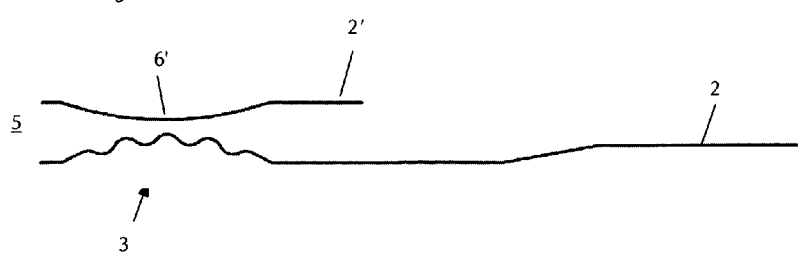
Fig. 31

Fig. 32
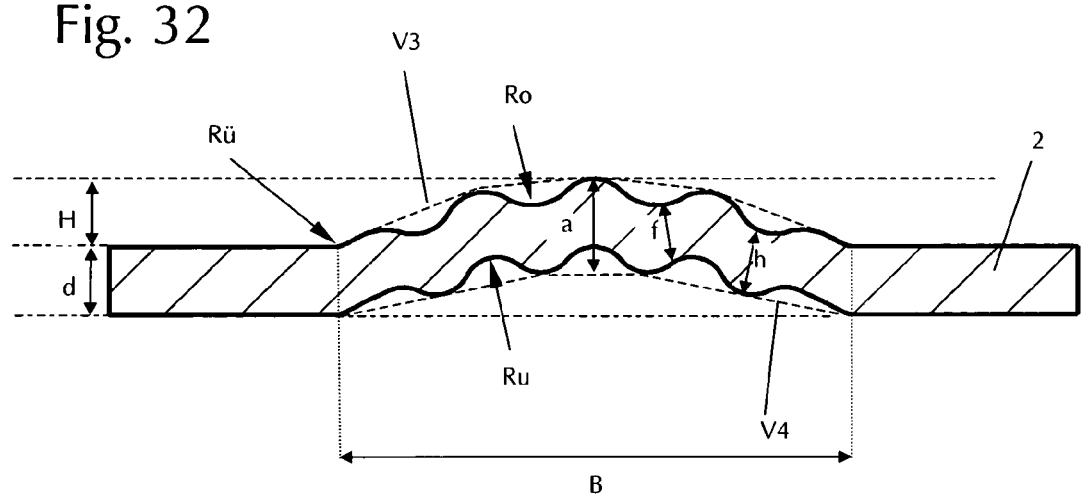
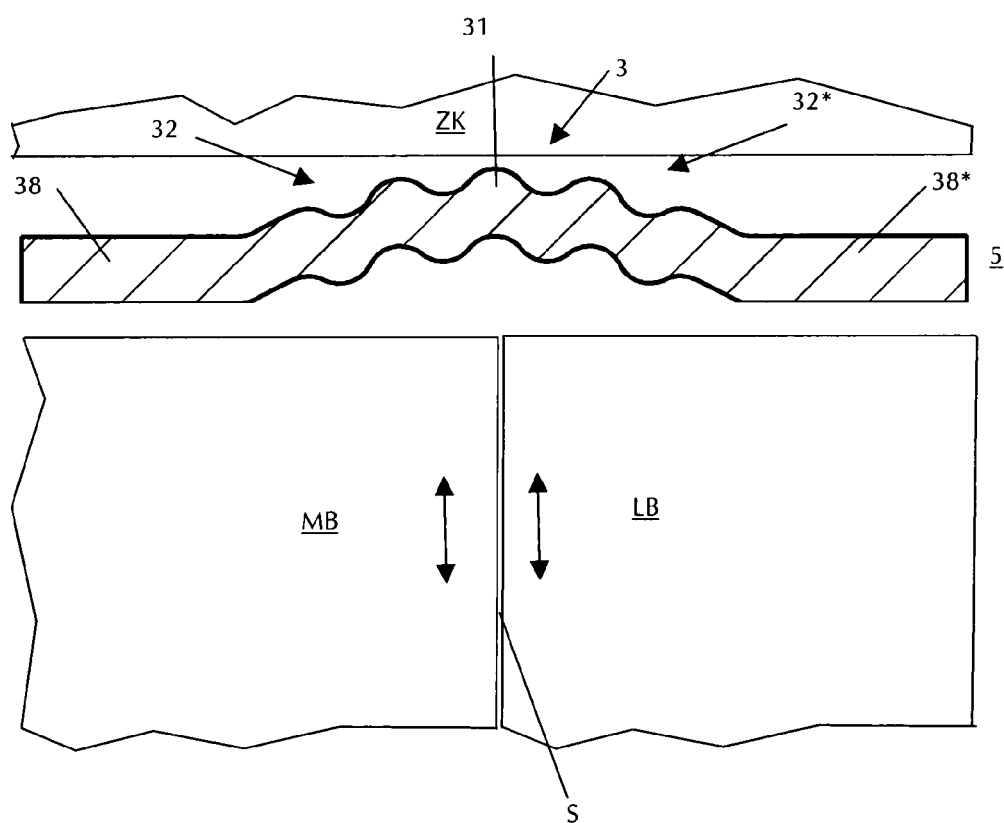
Fig. 33

METALLIC FLAT GASKET

BACKGROUND OF THE INVENTION

The invention relates to a metallic flat gasket, especially a metallic flat gasket, which is used in the area of internal combustion engines in motor vehicles, especially a cylinder head gasket, a gasket for sealing high pressures or a gasket in the area of the exhaust line including the exhaust treatment and exhaust processing, as for example a exhaust manifold gasket. In order to seal the combustion gas openings, such a gasket usually makes use of beads, which are formed into the gasket layer(s) and which completely encircle the combustion gas openings. In order to prevent that during operation the bead is excessively compressed and looses its elasticity, the bead is often accompanied by a so-called stopper, a deformation limiter which is harder to compress than a bead and which therefore is to prevent a complete compression of the bead during operation. Often, the stopper is arranged between the bead and the combustion gas opening, since this arrangement also allows the stopper to prevent hot combustion gases penetrating towards the bead. Because of the arrangement of bead and stopper next to each other, the design as described is quite space-demanding. This space is however not available for all applications. For example, the optimal design of a cylinder head gasket for an engine block with cylinder liners requires the arrangement of bead and stopper as elastic and non-elastic elements, respectively, to be adjusted to the individual engine, as the function of these elements requires them to keep a minimum distance and, as already mentioned each of the elements requires a minimum space.

A further drawback of the arrangement of bead and stopper as described results from the fact that the stopper is often manufactured as a separate element. It often consists, for example, of a ring-shaped, metallic layer, which is placed and fixed onto the metallic layer which comprises the bead. Apart from the increased consumption of material, this also means an increased manufacturing expense.

BRIEF SUMMARY OF THE INVENTION

The object of the present invention is accordingly to disclose a metallic flat gasket, which allows to prevent a camber formed into the metallic gasket, e.g. as a full bead or a half bead, from complete flattening without a separate stopper element. A further object of the invention is to keep the pressure distribution over the camber as homogenous as possible. An additional object of the invention is that it can be used not only in multi-layer flat gaskets but also in one-layer flat gaskets.

In a first aspect, the invention thus refers to a metallic flat gasket with at least one metallic gasket layer, which is predominantly flat and comprises a first and a second surface. The plane of the gasket is defined in such a way, that it is situated on the level of the edges of the largest through openings of the gasket. This means that those areas of the gasket which directly surround these openings, especially the combustion chamber or combustion gas openings, span the plane of the gasket. For some applications, e.g. high pressure gaskets, the largest through opening does not need to be the through opening that is surrounded by the sealing element according to the invention. The planar shape refers to a situation where the gasket is not installed between the surfaces to be sealed against each other, thus the uncompressed state of the gasket. Slight deviations from a complete planar state, e.g. shifts within the plane of the gasket which are due to production conditions are not considered as deviations from a planar state.

A camber is formed into this gasket layer, the camber protruding beyond the first surface of the gasket layer and having a larger length than width. The camber is formed in such a way that it possesses a first level which is a virtual level that runs in parallel to the plane of the gasket of the respective gasket layer through the foot of the camber in the first surface of the gasket layer. The plane of the gasket of the gasket layer is defined in such a way that it runs centered between the plane surface areas of the gasket layer. Thus, the first level is a virtual plane which runs in parallel to this center level with the first level being situated on the first surface of the gasket layer—the surface above which the camber protrudes—and runs through the foot of the camber. The foot of the camber is that area immediately next to the camber, in which the camber does not ascend yet above the first gasket layer, but possesses a slope of zero.

The camber is further defined by a second level, which is an additional virtual level running in parallel to the gasket plane of the gasket layer and comprises the highest point of the camber. The first and the second level thus delimit the highest and the lowest point of the camber in the form of virtual levels. The camber possesses an ascending slope between these levels. According to the invention, this slope area is designed in such a way that it possesses an undulating structure. The undulating structure consists of at least two waves each with a crest and a trough, the waves extending between the two levels. The flange area thus contains at least two oscillations in the direction of the first level and alternating with them further at least two oscillations in the direction of the other, second level. In a view from one of the two surfaces of the gasket layer, two wave crests and two wave troughs can be identified for each slope area. The foot points, the crest point or crest plateaus usually are not considered when determining the number of wave crests and wave troughs of a slope area. An exception is however given in the situation where the camber at its summit possesses two crest points—one per slope—between which a single wave trough and no large wave plateau is situated. In this case and only in this case both the crest point of a slope as well as the wave trough situated in the middle are considered in counting the number of wave crests and wave troughs. Thus, the central wave trough is counted as a wave trough for both slope areas.

With the inventive design of the slope areas of the camber, the macroscopic camber in the metallic gasket layer is overlapped with a micro structure. This micro structure having a shape of at least two consecutive waves causes an effective thickening and stiffening of the camber. As a consequence, it is considerably more difficult to compress the camber than without the micro structure. In this way, a camber is formed which stiffens itself and therefore without additional means acts as an extremely reliable and long-living sealing element. This allows to considerably reduce the demand of space of the sealing element. As a rule, it does not exceed the one of an ordinary bead or half bead.

The basic profile of the camber, thus the basic course of the camber without consideration of the undulating structure in the slope area, in general corresponds to the one of a conventional bead or half bead. In a widthways sectional view, the camber shows a generally arch- or trapezoidal shape. Omega-shaped, triangular or other sectional profiles are possible as well. The sectional view may possess a crest point or a plateau at the summit of the camber. In case of a full bead, the camber possesses two feet of the bead which are arranged at opposite footpoints of the camber as well as two corresponding slope areas which ascend towards the summit of the bead. Instead of a crest point, a crest plateau may be present, thus an area of constant height. The widthways section can be symmetric or non-symmetric. In case the camber is a half bead, only one foot of the bead and only one slope area are present. In this case, the crest point is comparable to a second bead foot on the opposite end of the slope area. The widthways section thus corresponds to a halved sectional profile of a full bead, meaning a halved arch or a halved trapeze. As already mentioned, such forms are known from conventional gaskets, thus from the state of the art. The general design of the camber is not different from the form of the beads or half beads of the state of the art. The difference is given in the superposed undulating structure in the slope area that has been described beforehand.

In case of a full bead, two slope areas ascending from the respective foot towards the crest of the camber are present. It is in general possible to only provide one of the slope areas with the undulating structure. However, it is preferred that both slope areas dispose of at least two waves each with a wave crest and a wave trough. It is especially preferable that the undulating structure is uniform in both slope areas. Nevertheless, the wave structures of both slope areas may be designed differently as well. The wave structures—be they identical or different—can also be combined with differently designed slope areas, thus asymmetrical sections of the macroscopic camber. It is further possible to vary the macroscopic structure of the camber and/or the undulating structure along the longitudinal direction of the camber. For example, the height of the camber, the width of the camber and/or the steepness of the one or several slope areas of the camber may be varied along the longitudinal direction. The same is true with respect to the design of the undulating structure in one or several of the slope areas. This variation allows for a deliberate adaptation of the camber and its deformability to the opposing faces to be sealed and to the operational conditions in the built-in state of the metallic flat gasket.

The course of the camber in its longitudinal direction may in general have any shape provided the length is larger than the width. In its longitudinal direction, the camber may be linear, curved, for example arch-shaped or meandering, it may be angulated once or several times or in a similar manner. Furcating courses are possible as well. The camber may have a circular form which is closed or an open form with discrete ends. With a closed course, it is preferred that the camber encircles a through opening in the gasket layer. This through opening can be any through opening of the gasket—in case of a cylinder head gasket for instance a combustion chamber opening, an opening for cooling water, for oil or for bolts. It is also possible that a single camber simultaneously encircles several through openings. In general, it is preferred that the camber is embossed to a larger extent in those edges of openings with a higher dynamic strain (e.g. the combustion chamber opening) than the edges with a lower dynamic strain (e.g. bolt holes). The camber superposed by the undulating structures can in general be arranged in the same way in the metallic gasket layer as conventional sealing or support beads. Thus, it can also be used as a support element in the metallic flat gasket according to the invention. In this case it is not necessary that the camber completely encircles a through opening. A bolt opening or another opening may thus only partially be circumvented by the camber. Moreover, it is possible to provide the gasket layer with a camber that is not directly related to a though opening, the camber then acts as support element, e.g. in the so-called backland of the gasket, meaning the area adjacent to the outer edge of the gasket. One possibility for such a support element is a linear arrangement distant but parallel to one of the outer edges of the gasket. It is possible to provide the gasket with several supporting cambers or with cambers that cover a large area of the gasket layer. If cambers are used in one gasket both as sealing and as support elements, the height of the support element is often smaller than the height of the sealing element.

The longitudinal course of the waves within the undulations corresponds with the longitudinal extension direction of the camber as a whole. The profile of the waves may be sinusoidal. Again, the profile is to be understood as the widthways section of the undulating structure. The section of each wave trough and wave crest within the sinusoidal undulating structure is usually arch-shaped, especially with the shape of a circular arc or elliptic. However, the wave crests and troughs of the undulating structure may also be triangular, trapezoidal or have another profile.

According to the invention, it is sufficient if the undulating structure is exclusively present in the slope area of the camber. It is however preferred if the undulating structure extends over the whole width of the camber. In this case, the undulating structure is not only present in the slope areas, but also in the area of the crest point or the crest plateau of the camber. It is especially preferable that the wave crests and troughs are present along the whole width of the camber. This means that the sections of the undulating structures extending from one wave trough to the neighboring trough or from one crest to its neighboring crest essentially have the same width. The term "width of a section" here is to be understood as the distance between two parallel lines which run through the crest points of two wave crests neighboring each other and which intersect with the level of the first and second plane of the gasket. The term "width of the wave troughs" is to be understood analogously.

The widthways section of the camber is characterized in case of a half bead by one and in case of a full bead by two slope areas that steadily ascends from the first plane of the gasket towards the second plane of the gasket. The overall profile of the camber is, as already mentioned, for example trapezoidal, but preferable in the shape of a circular arch or of an ellipse. In the latter two cases, an envelope curve linking the crest points of the individual wave crests also has the shape of a circular arch or of an ellipse. The same is true for an envelope curve linking the minima of the wave troughs. The height of the crest points of the individual wave crests increases steadily but with a varying degree towards the direction of the crest of the camber. As to the height of an individual step between neighboring wave crests or between neighboring wave troughs, respectively, along the widthways course of such a camber, the difference in height decreases with each step towards the crest of the camber. Thus, if one measures the height with which the individual crest points of the wave crests protrude beyond the first plane of the gasket and calculates the difference between the heights of each pair of neighboring crest points, this difference decreases in the direction from the foot point of the camber towards its summit. This allows for an arch-shaped camber in which the pressure is evenly distributed among the individual waves. This geometry is given both in the new state as well as in the relaxed state after spring back from the compressed state.

As to the design of the undulating structure within the camber, those embodiments have shown to be advantageous, which have slope areas extending steadily from their foot point towards their crest point with an undulating structure being as regular as possible and having a relatively small structural magnitude. The relationship between the undulating structure and the overall structure of the camber shall be described in the following. In a widthways section of the camber, thus a section orthogonal to the longitudinal extension direction of the camber, a virtual center line can be introduced, which runs at half material thickness of the gasket layer along the camber. In the area of the undulating structure, this center line follows the course of the undulating structure. Two further lines can be constructed within this section of the camber, which shall be referred to as first and second connection lines in the following. Both connection lines are composed of straight sections. In case of the first connection line, these straight sections each connect the minima of neighboring wave troughs on the first surface of the gasket layer with each other. In case of the second connection line, the straight sections connect the minima of the neighboring wave troughs on the second surface of the gasket layer. The undulating structure within the camber is designed in such a way, that neither the first nor the second connection line intersects with the central line. This is only possible with relatively small depths of the wave troughs. It is especially these small amplitudes which are responsible for a regular and efficient support over the whole width of the camber.

The undulating structure can be present along the whole longitudinal course of the camber or only in one or several sections along this longitudinal course. It is preferred that the undulating structure is present over the whole longitudinal extension of the camber. For ease of production, it is further preferred to design the undulating structure uniformly over this whole extension. It is however also possible to vary number, form and/or height of the waves of the undulating structure along the longitudinal direction of the camber. In this way, the stiffness of the camber can be deliberately varied along the longitudinal course of the camber.

The camber and the undulating structure present within the camber are preferably produced by embossment into the gasket layer. Both structures can be produced within the same embossment step. An especially preferable embodiment of the undulating structure within the camber is achieved with a die, the male and female parts of which in their closed state are complementary to each other. Since the embossment dies in those areas of the gasket layer which later on correspond to the flank between wave crests and wave troughs come closer to each other than in the areas of the maxima of the wave crests and the minima of the wave troughs, the material thickness in the area of the flanks of the waves is smaller than in the remaining areas of the undulating structure. The undulating structure is produced in such a manner that a flank tapering of about 5 to 40%, preferably 10 to 35% and most preferably between 15 and 30% in comparison to the material thickness of the gasket layer in the area of the wave crest or the wave trough can be observed with the material thickness being always measured orthogonal to the material surface. The embossment of wave crests and wave troughs in the undulating structure due to the oscillation to both surfaces of the gasket layer results in an effective thickening in the area of the camber. The distance between the envelope curves, which connect the wave crests on both surfaces of the gasket layer is larger than the thickness of the original gasket layer before the embossment of the undulating structure. Surprisingly, in addition to an increased tensile strength in the areas with the flank tapering, an increased sheer stress is observed. This shows that the flank tapering is accompanied by a grain refinement, which does not only harden the flank areas but also results in an increased ductility. It is even possible to measure a significantly higher hardness for the flank region than for the areas of crests and troughs or the flat region. This microscopic consequence of the flank tapering together with the macroscopic flank tapering and the effective thickening leads to a considerably reduced compressibility of the camber compared to a camber without the undulating structure. In this way, a camber is produced which supports itself and constitutes an extremely long-living sealing element. The longevity is further supported by the decreasing increase of height of the wave steps and the uniform distribution of the pressure resulting from it. The demand in space nevertheless is not larger than for a conventional bead without undulating structure.

Even for through openings that are difficult to be sealed, such as the combustion gas through openings in cylinder head or exhaust manifold gaskets, the bead stiffening itself alone is sufficient and constitutes an excellent sealing means. Its sealing effect outperforms the sealing effect of a conventional bead of comparable shape considerably. This is also due to the multiple sealing lines which are formed in the area of the wave crests on both sides of the gasket layer. This large amount of sealing lines provides for an excellent adaptation to the surfaces to be sealed and for an outstanding sealing effect, which is maintained even with strong and permanent strain or ongoing movements of the sealing gap over a very long period of time. The resilience is considerably increased compared to conventional beads of the same basic shape.

The camber that comprises the undulating structure is sufficient as a single sealing element for a through opening. The sealing element according to the invention is especially suited for applications, in which the sealing element is situated in a main load connection. This does however not exclude the sealing element according to the invention to be used in combination with one or more other sealing elements. The camber with the undulating structure in principle could also be used in combination with a stopper element. However, this is in general not preferred, since the camber with the undulating structure does not require any further support element. It seems more useful to combine the camber provided with the undulating structure with a conventional bead as an additional sealing element. By request, the resiliencies of the two elements can be adjusted one relative to the other. It is for instance possible to design the conventional bead less stiff than the adjacent camber which is provided with the undulating structure, which causes the latter to function as a support element for the adjacent bead. On the other hand, it is also possible to design the bead by corresponding shaping in such a stiff manner that the camber with the undulating structure is situated in the auxiliary load connection.

As already mentioned, the camber provided with the undulating structure does not need to be used as a circularly closed sealing element. It can rather also be used as a pure support element, e.g. as a support in the edge region of the gasket. In the same way, the camber comprising the undulating structure can be used as a support element for an elastomeric sealing element, e.g. a sealing lip.

The camber with the undulating structure is very suitable to receive a coating. The wave troughs in the undulating structure then act as chambers which prevent the coating from flowing away and in this way contribute to an improved adhesion of the coating on the gasket layer. It is possible to use all kind of coatings known from the state of the art for the coating of metallic flat gaskets, for example such ones which improve the micro sealing or the sliding friction. The exact manner of application of the coating allows for example for an agglomeration of the coating on the convex side of the camber. It is preferred that this concavity is incompletely filled by the coating, preferably filled up to 80%, more preferably filled up to 50%.

The metallic flat gasket according to the invention can be produced as a one-layer gasket. Because of the use of the camber with the undulating structure, no further elements, such as stoppers, are required. The metallic flat gasket according to the invention can also be a multi-layer gasket with two or more gasket layers, at least one of which comprises the camber with the undulating structure. The further gasket layer(s) can be designed arbitrarily. It can but does not need to contain one or more cambers provided with an undulating structure, no matter whether it is used as sealing or as support element. It is preferred that a camber with an undulating profiling in a further gasket layer is arranged in such a way that it faces another sealing or support element in the adjacent layer. A camber with an undulating structure, a bead or a half bead can for instance be used as such a sealing or support element. It is preferred that the sealing or support elements that face each other are arranged mirror-symmetrical with respect to their macroscopic shape. A camber with an undulating structure may however also face an even area of an adjacent layer. In this case, the even area forms an even support which allows a good seating of the wave crests. The cambers or beads of the further gasket layer can be arranged in such a way that their crest faces towards the crest of the camber in the first gasket layer. Alternatively, they can also point away from each other. In a multi-layer gasket, the gasket layers may have the same or a different extension. One or several of the gasket layers of the metallic flat gasket may be shortened relative to at least one larger gasket layer and be spared in the edge region of the gasket. It is for instance possible that they are formed as an inlay which circumvents one or several through openings in the form of a ring or of spectacles. It is also possible that the gasket layer that contains the camber with the undulating structure is such a reduced gasket layer.

The metallic flat gasket may contain other sealing elements which correspond to conventional sealing elements known from the state of the art, e.g. further sealing elements in the form of beads or elastomeric sealing lips. Support elements, such as beads or half beads as well as material thickenings made through embossing may be present as well. Crankings may be used in order to symmetrically distribute the effective height of the sealing elements. It has already been mentioned that at least one of the gasket layers on at least one of its surfaces may be coated partially or throughout. The metallic flat gasket according to the invention can be produced using conventional materials and conventional methods and tools known from the state of the art. Preferred materials for the at least one gasket layer are steel, especially spring hard steel or stainless spring steel. The spring hard properties may already be present before the introduction of the camber or afterwards, e.g. using thermal treatment. Other gasket layers may be produced from the same or a different material, e.g. carbon steel or, especially for smooth gasket layers, non-resilient steel. Gasket layers in the exhaust gas line, including exhaust gas treatment and exhaust gas processing, are faced to higher temperatures, e.g. up to 800° C., which suggests the use of high temperature resistant steels, e.g. the use of a steel that is rich in Nickel.

A preferred application for the metallic flat gasket according to the invention is as a gasket in the field of internal combustion engines, especially as cylinder head or exhaust manifold gaskets. In this case, it is especially preferable to use the camber with the undulating structure as a sealing element for the combustion gas opening. The term combustion gas in this respect explicitly also comprises exhaust gas and recirculated exhaust gas. As it is known for beads in the state of the art, it is also possible to unite the cambers with the undulating structure of neighboring through openings in the area between these through openings, the so-called web area, to a single camber section. It is preferred that the cambers be joined in such a way that those slope areas which are remote from the through opening do not enter into the web area but run together outside the web area. The complementary slope areas unite to form a camber with undulating structure, which is guided through the web area, at the other terminal of which this camber separates into two slope areas which unite each with a slope area which does not cross the web area. Because of limited space in the web area, it can be preferred to reduce the number of waves within an undulating structure so that only a part of those waves which are brought together cross the web area.

BRIEF DESCRIPTION OF THE DRAWINGS

In the following, the invention is described on the example of some drawings and pictures. They are of schematic character and describe only some preferred embodiments of the invention without restricting the invention to those embodiments. The same reference numbers refer to the same elements throughout the drawings and pictures. In order to facilitate their distinction, in the sectional views but not in the top views, elements that belong to different slope areas are marked with an asterisk, those that belong to different gasket layers with an apostrophe and those that belong to different through openings with a cross. In some figures, especially with mirror symmetric cambers, some of the reference numbers on one of the sides are omitted for clearness reasons. The drawings and pictures show:

FIGS. 4 to 11 partial sectional views through the gasket according to FIG. 1 along line X-X;

FIGS. 18 to 26 partial sectional views through different embodiments of two-layered metallic flat gaskets according to the invention similar to a partial sectional view along line Y-Y;

FIGS. 27 and 28 partial sectional views in the same section as FIGS. 18 to 26 but on the example of three-layered flat gaskets according to the invention;

FIGS. 29 to 31 further examples of two-layered metallic flat gaskets according to the invention in partial sectional views each with one gasket layer having a reduced extension relative to the other gasket layer;

FIG. 32 a representation corresponding to FIGS. 3 to 6 depicting the dimensions;

FIG. 33 a use of the gasket according to the invention on the example of a cylinder head gasket that seals an engine with liners;

DETAILED DESCRIPTION OF THE INVENTION

Figure 1:
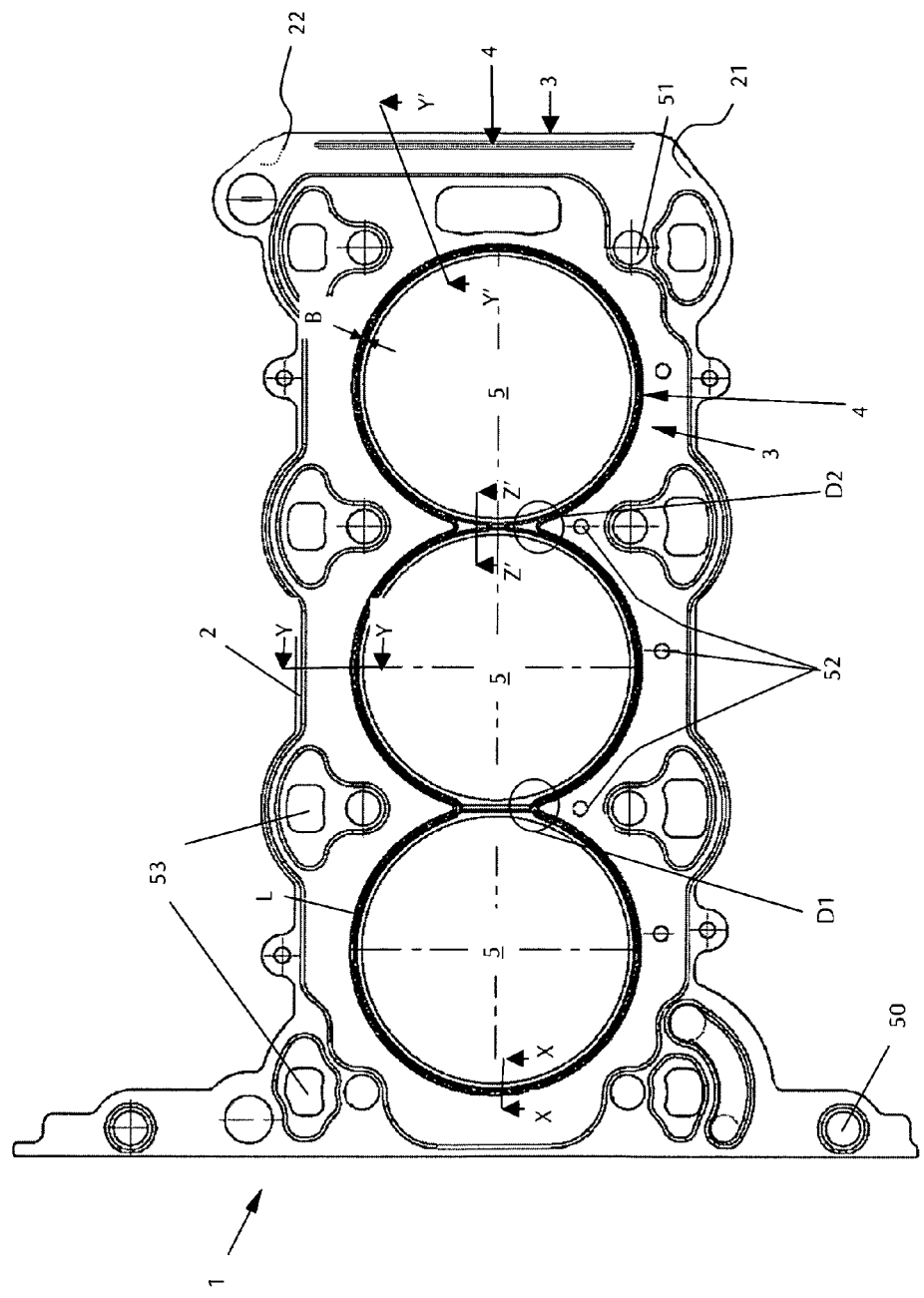
FIG. 1 a top view of a metallic flat gasket according to the invention on the example of a cylinder head gasket.

FIG. 1 shows a top view of a metallic flat gasket 1 on the example of a cylinder head gasket. The top view depicts a gasket layer 2 with a first surface 21 as well as an opposite second surface 22. The combustion gas openings 5 are surrounded by a sealing element, which is embossed into the gasket layer 2. The sealing element is a ring-shaped camber 3 that protrudes above the first surface 21. The longitudinal extension of the camber 3 in the circular direction around the combustion gas opening 5 has a length L which is considerably larger than its width B. A microscopic structure is formed in the camber 3, which consists in several undulations, which extend over the whole width B of the camber 3. The longitudinal extension direction of the individual waves corresponds to the longitudinal extension direction of the camber 3. In FIG. 1, concentric lines depict the undulating structure 4. The gasket layer 2 contains combustion gas openings 5 as well as further through openings 50, especially bolt through openings, cooling water through openings 52 and oil through openings 53, with the further through openings 50 being situated closer to the outer edge of the gasket. An elongate, straight camber 3 can be found near the right lateral edge of the gasket, which camber functions as support element for this lateral edge. There are several ways to lead the cambers through the narrow web area between two combustion chamber through openings 5, two of which are shown in areas D1 and D2. In the example of D1, the transition area is rather short and both slope areas 32 of the camber 3 show a considerable change in direction, which is however different for both slope areas 32. In the example shown in D2, only the slope area remote from the combustion chamber through opening changes its direction in order to directly unite with the corresponding slope area of the adjacent combustion chamber opening, while the slope areas close to the combustion chamber opening continue with unchanged curvature and unite only by degrees.

Figure 2:
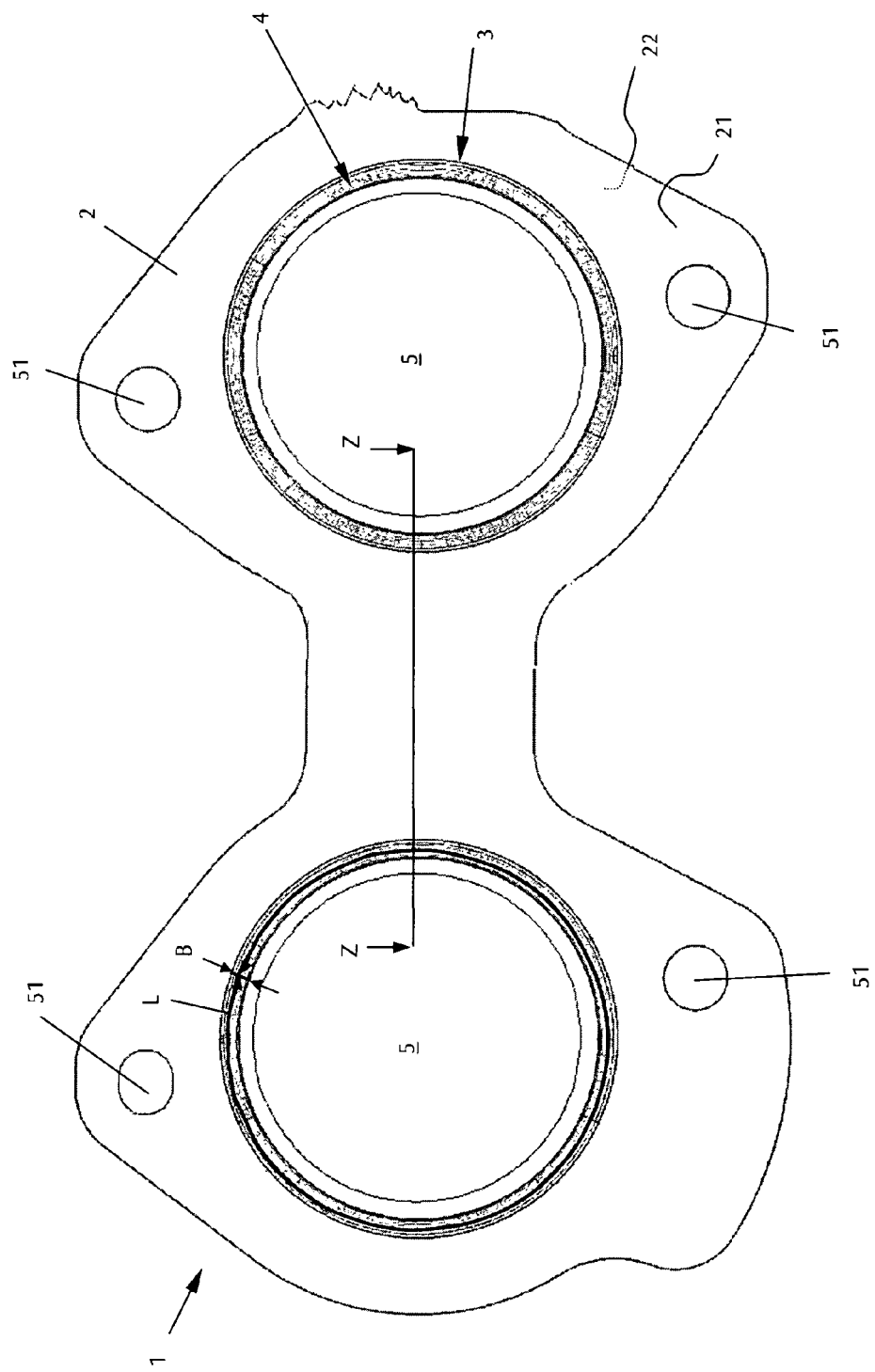
FIG. 2 a partial top view of a metallic flat gasket according to the invention on the example of an exhaust manifold gasket.

FIG. 2 shows a partial top view of another metallic flat gasket 1 on the example of an exhaust manifold gasket. The partial view shows the region around two of e.g. four combustion gas openings 5. Again, the combustion gas openings are surrounded by a camber 3 with an undulating micro structure 4. Moreover, bolt openings 51 are indicated.

Figure 3:
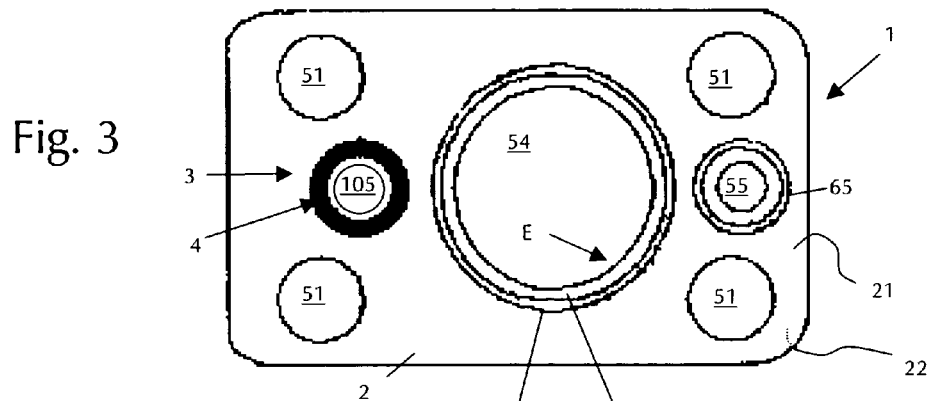
FIG. 3 a top view of a metallic flat gasket according to the invention on the example of a gasket for a high pressure pump.

FIG. 3 as a further application of the camber 3 according to the invention shows a gasket 1 with a high pressure opening 105. The high pressure opening 105 does not constitute the largest opening in the gasket 1, but the opening 54, which seals a cylinder liner with a piston against the cylinder head of a high pressure pump. As a consequence, the gasket plane E is spanned by the edge zone R around the through opening 54 on the side of the bead 64 that points towards the through opening. The gasket further shows a low-pressure through opening 55, which is sealed by a bead 65, as well as four bolt openings 51. Here, the high pressure opening 105 is surrounded by the camber 3 according to the invention.

The detailed design of the camber 3 with the undulating structure 4 shall be explained in the following considering sectional views. All sectional views correspond to a section in the widthways direction of the camber, thus orthogonal to the extension direction of the camber. These sectional views do not only apply for cylinder head gaskets or exhaust manifold gaskets but for example also for high pressure gaskets. In the latter case the statements made with respect to the combustion gas openings 5 applies to the openings 105 that bear high pressure.

Figure 4:
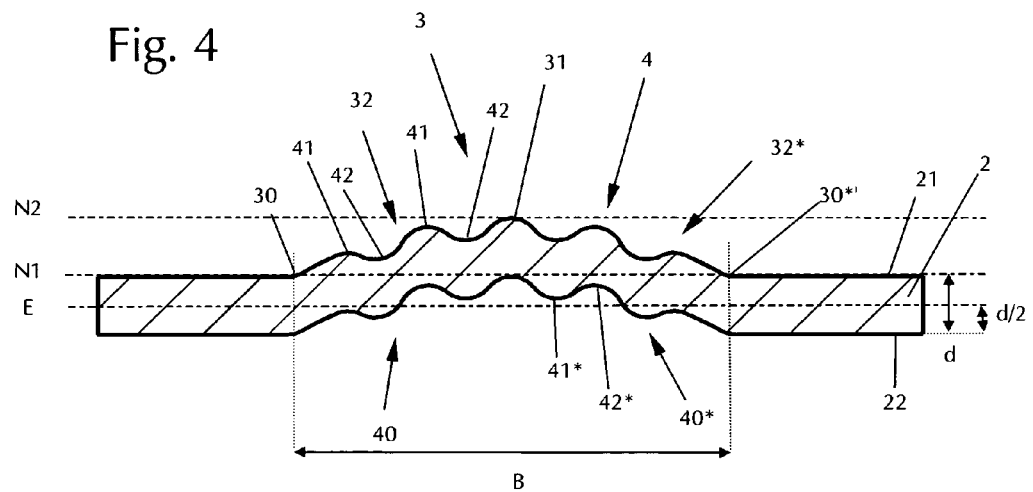

FIGS. 4 to 7 correspond to sectional views along line X-X in FIG. 1. There are only slight differences in between these sectional views, e.g. with respect to the dimension of the cambers or the undulating structure. As can be seen in FIG. 4, the camber 3 protrudes above the first surface 21 of the gasket layer 2. It extends between two foot points 30 and 30*, the transition point from the flat surrounding of the camber to the camber, where the slope of a tangent is still zero. In the area of the camber, which extends between the foot points 30 and 30* with a width B, the slope is different from zero. As to its altitude, the camber 3 extends between a first level N1, which comprises the foot points 30 and 30*, and a second level N2, which contains the crest point 31, the highest point of the camber 3, in some cases the two crest points 31 and 31* (see e.g. FIG. 8). Both levels N1 and N2 run in parallel to the gasket plane E of the gasket layer 2. This plane E extends in the middle, thus at half thickness of the material and is spanned by the areas which immediately surround the combustion gas openings. Between the foot points 30, 30* and the crest point 31, the camber 3 shows two slope areas 32 and 32*, which steadily ascend from the foot points in the direction of the crest 31. In each of these slope areas 32 and 32*, two waves 40 are formed. Each of these waves 40, when considered versus surface 21, has two wave crests 41 and two wave troughs 42, that alternate. The same is true for surface 22 of the gasket layer 2. When counting the wave crests and wave troughs, one has to take into consideration that neither the foot points 30 and 30* nor the crest point 31 are included as long as a single crest point 31 of the camber 3 is given. Thus each of the slope areas 32 or 32* comprises two oscillations in the direction of the upper level N2 and two oscillations in the direction of the lower level N1, respectively.

Figure 5:
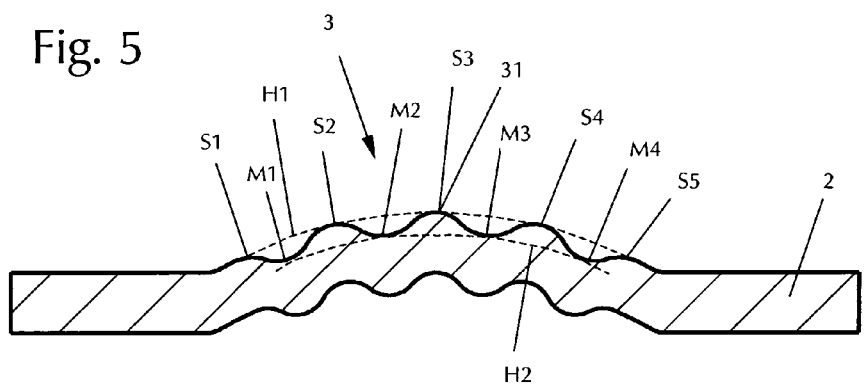

FIG. 5 illustrates the overall arch-shaped course of the camber 3. If one connects the individual crests of the wave crests 41 to each other, thus the points S1, S2, S3, S4 and S5 by constructing an envelope curve (H1), a curve results, which corresponds to a segment of a circular arch. The same is true if one connects the minima M1 to M4 of the wave troughs 42 with an envelope curve (H2) with each other. The macro structure with an arch-shaped course—the camber 3—is thus superposed by a micro structure—the undulating structure 4—in which several waves 40 with a width and height which is smaller than the width and height of the camber 3 in the gasket layer 2.

Figure 6:
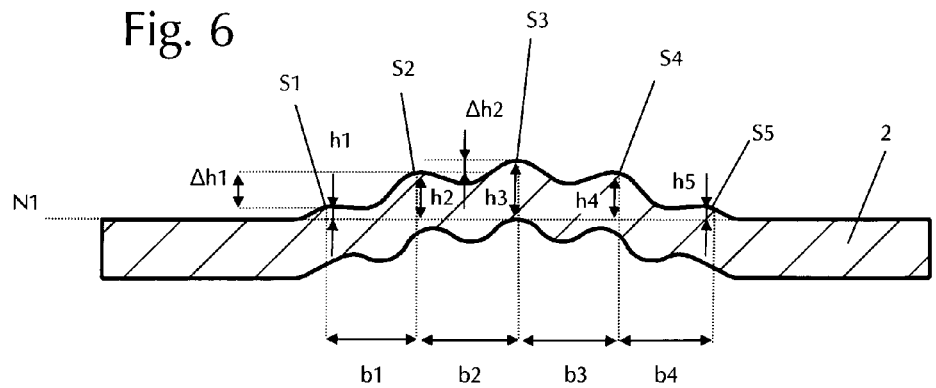

FIG. 6 depicts the topography of the undulating structure 4 within the camber 3. As can be seen from this figure, the structural width of the waves of the undulating structure within the camber is rather constant. The structural width is defined as the distance between adjacent wave crests 41. The width is measured between orthogonal lines, which intersect with the crest points S1 to S5 and extend orthogonal to the levels N1 and N2 as well as to the gasket plane E of the gasket layer 2. The distances b1 and b4 on the one hand and b2 and b3 on the other hand are essentially identical, respectively. In each slope area 32 and 32*, the undulating structure results in several steps, which ascend continuously towards the crest point 31. The difference in height ($\Delta h1, \Delta h2, \ldots$) between the steps does however not increase but decreases in the direction of the crest point 31. The difference in height $\Delta h1$ between the wave crest point S1 and the adjacent wave crest point S2 is considerably larger than the difference in height $\Delta h2$ between the wave crest point S2 and the next wave crest point S3. Structural width and height of steps can be adapted to the respective conditions. There is a slight difference in these values between FIGS. 3, 4 and 5.

Figure 7:
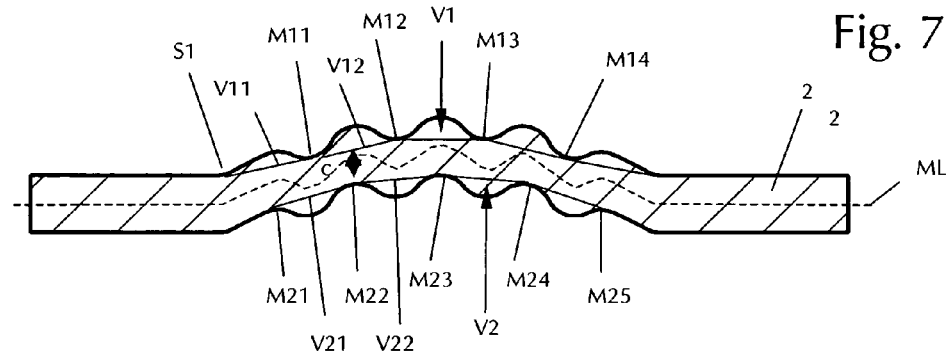

A further advantageous property of the undulating structure 4 within the camber 3 becomes obvious from FIG. 7. A center line ML has been attributed to the gasket layer 2 in the area of the camber 3, which depicts half the thickness of the gasket layer material (d/2), relative to the local thickness d of the gasket layer 2. The material thickness and its half are determined orthogonal to the gasket plane E. In the area of the undulating structure 4, the center line ML thus follows the curse of the gasket layer 2. Two further lines are depicted in the figure, which are referred to as linking lines V1 and V2. These linking lines consist of individual straight sections V11, V12, ... and V21, V22, ..., respectively. These virtual line sections link the minima M11 to M14 and M21 to M25, respectively, of the wave troughs 42 on the first surface 21 or the second surface 22, respectively, of the gasket layer 2 with each other. As becomes obvious from FIG. 7, the center line ML does not intersect the linking lines V1 and V2. This is due to the fact that the undulating structure, as described beforehand, has only a small altitude. It is only a micro structure within the camber. It is preferred that this micro structure is formed continuously over the complete width of the camber. It thus does not only extend along the slope areas 32 and 32*, but continues at the crest point 31 of the camber 3 and has its ends at the respective foot points 30 and 30* of the camber 3.

Figure 8:
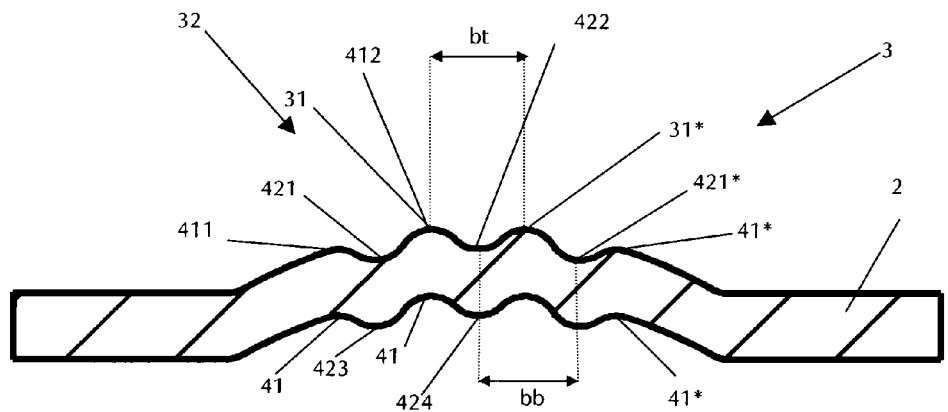

There is one exception as to the counting of the wave crests and wave troughs, namely for a camber 3 with exactly two crest points 31, 31* on the convex side of the camber between which exactly one wave trough 422, which is no wide plateau, is formed. FIG. 8 illustrates the way the wave crests and wave troughs are counted in this exceptional case. As usual, both wave crests 411 and 412 of a slope area 32 are considered. In this case, the wave crest 412 corresponds to a crest point 31 of the camber. Although the slope area 32 as such only contains one wave trough 421, the wave trough 422, which is situated symmetrically between the crest points 31, 31* is counted as a wave trough for both slope areas 32, 32*, too. It is thus counted in duplicate. For the context of this invention, a plateau has a width that is at least twice the width bb of a wave crest 41—measured from foot point to foot point of the adjacent wave troughs, at the same section. In case bb and bb*, thus the width of the wave crests on both ascending slopes do not coincide, their average is taken into consideration. While the width of the wave crests bb or wave troughs bt, respectively, usually only varies between 15 and 20% for wave crests and wave troughs at the same section, a broader variation at the middle of the camber in some cases is advantageous, e.g. in order to adjust the stiffness or other macroscopic properties of the camber. Moreover, the position of fluid carrying elements, e.g. the water jacket, in the parts to be sealed in some cases require a distance bt in the middle of the camber which is slightly less than 200% of the distance bb, but does not allow a further undulation to be arranged. It needs to be stressed once more that this definition is not applicable to cases with more or less than two crest points on the convex side of the camber 3. It is also not valid for cases with a plateau between the exactly two crest points 31, 31*, thus a distance of 200% or more of bb for the other wave crests and wave troughs.

Figure 9:
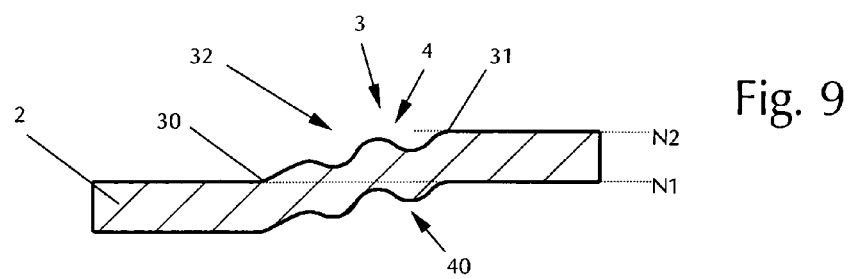
Figure 12:
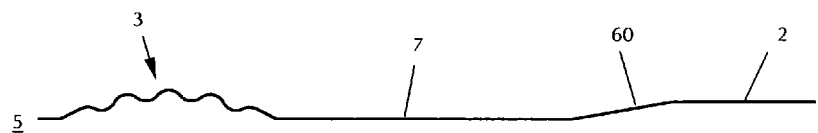
FIGS. 12 to 15 partial sectional views through the gasket according to FIG. 1 along line Y-Y.

FIG. 9 shows a further embodiment of the metallic flat gasket according to the invention in a partial sectional view in the area of a camber 3. In contrast to the previous figures, the camber 3 here is formed as a half bead. The camber 3 thus ascends from a foot point 30 towards a crest point 31, which is followed by a flat area of the gasket layer 2. There is only one slope area 32 with an undulating structure 4 between the levels N1 and N2. This undulating structure consists of two waves 40, each of which with a wave crest and a wave trough.

FIG. 10 illustrates the example of an undulating structure, which exceeds beyond the feet of the camber 30, 30* and reaches into the flat area of the gasket layer 2. This is still within the scope of the invention given that the slope areas 32, 32* are provided with the undulating structure 4 as described before.

FIG. 11 describes a camber 3 with an undulating structure 4, which essentially corresponds to the cambers of FIGS. 4 to 7. Here, the camber is combined with a bead 6, which runs adjacent to the camber 3 and also encloses the combustion gas opening 5 in a concentric and closed manner. The bead 6 can be situated between the camber 3 and the combustion gas opening 5 or remote from the latter. As the camber 3 has a larger height than the bead 3, in the installed state, the camber is situated in the main load connection and takes up the majority of the pressure forces. It is preferred that the camber 3 with the undulating structure 4 is designed in such a way that in a compressed state, all wave crests butt to the opposite surfaces to be sealed, so that each of them forms a sealing line with the surface to be sealed.

Figure 13:
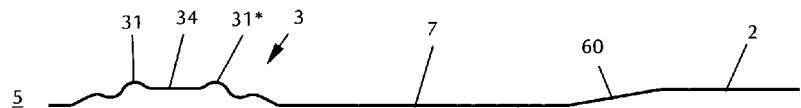

For ease of drawing, the following FIGS. 12 to 31 and 34 to 37 illustrate the gasket layer 2 only with a line, not with an area. The distances between the individual sealing elements are only of schematic nature and do not represent any scale, especially not in the ratio of the distances to each other. FIGS. 12 to 15 are partial sectional views between the combustion gas openings 5 and the edge of the metallic flat gasket 1. The combustion gas opening is in each case encircled by a camber 3 with an undulating structure 4. In the gasket according to FIG. 12, the camber 3 is followed by a flat section 7, which is in turn followed by a half bead 60 that protrudes over the flat section in the same direction as the camber 3. This half bead 60 usually runs along the outer edge of the gasket or encircles openings other than opening 5. It is never running concentrically to the camber 3. In contrast to FIG. 12, the camber in FIG. 13 is not superposed continuously over the whole width of the camber with an undulating structure, but shows a plateau 34 in the middle of the camber between the crest points 31, 31*. An alternative embodiment, which is not depicted in a figure provides a plateau on the level of a crest point, thus it forms a crest plateau.

Figure 14:
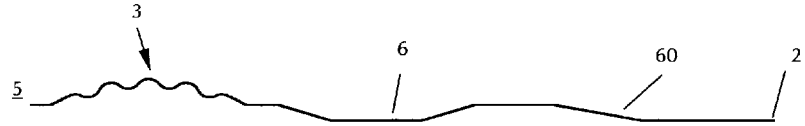
Figure 15:
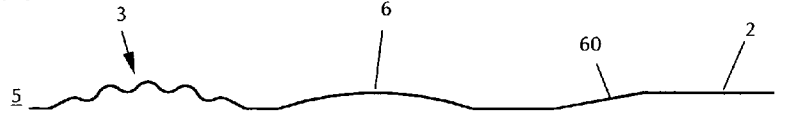

The difference in the following gaskets lies in the design of the outer edge of the gasket, which is shown on the right hand side of the figures. The straight section 7 of FIGS. 12 and 13 in FIG. 14 is replaced by a bead 6, which points to the opposite direction of the camber 3. While the bead of FIG. 14 has a trapezoidal cross section, the bead 6 in FIG. 15 shows a rounded bead with arch-shaped cross section, which moreover points to the same direction as the camber 3. As already mentioned, the distances are not scaled. As a rule, elements 3 and 6 are very close while the distance between elements 6 and 60 is a multiple of this distance.

Figure 16:
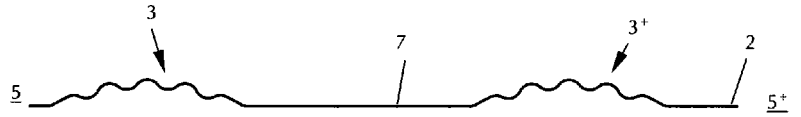
FIG. 16 a partial sectional view through the gasket according to FIG. 2 along line Z-Z.

FIG. 16 shows a sectional view in the area between two combustion gas openings 5, 5+ of the exhaust manifold gasket in FIG. 2. They are each surrounded by a camber 3, 3+ with an undulating structure. A flat section 7 is located between both cambers 3, 3⁺. In this gasket, as can also be seen from FIG. 2, sufficient space is available in the web area so that the two cambers can independently run through the web area.

Figure 17:
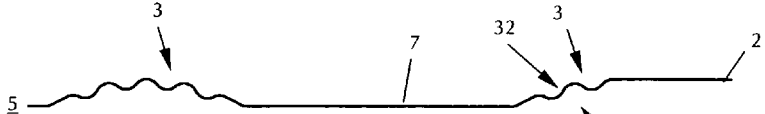
FIG. 17 a further partial sectional view through a one-layered metallic flat gasket according to the invention.

A further example of a section between a combustion gas opening 5 and a gasket edge is shown in FIG. 17. Compared to the gasket of FIG. 12, here the half bead 60 is replaced by a camber 3 with an undulating structure. This camber 3 has only one ascending slope 32 with an undulating structure 4 and therefore in its basic shape corresponds to a half bead.

FIGS. 18 to 26 show examples of sectional views through two-layered metallic flat gaskets in the area between the combustion gas opening 5 and the gasket edge. The lower gasket layer in the gasket according to FIG. 18 essentially corresponds to the one-layer gasket of FIG. 12. It is accompanied by a further gasket layer 2' which in the surroundings of the combustion gas opening 5 shows a completely flat section 7'. Only in the region of the gasket edge a half bead 60' is provided, which is mirror-symmetric to the half bead 60 of gasket layer 2. The gasket in FIG. 19 is a mirror-symmetric variant of the gasket of FIG. 18. In case of a cylinder head gasket, the gasket layer with the camber 3 may be oriented to the engine block or inversely to the cylinder head.

FIGS. 20 and 21 show both two-layered metallic flat gaskets in which the camber 3 in the first gasket layer 2 is faced with a camber 3' in the second gasket layer. Both cambers have an undulating structure 4. In FIG. 20, the crests of the cambers 3, 3' point away from each other, while in FIG. 21, they point to each other.

The upper gasket layer of FIG. 22 essentially corresponds to the gasket layer of the gasket according to FIG. 13, but with inverse orientation. Additionally, a second gasket layer 2' is present, which in the edge region is designed mirror-symmetrically to the first layer. In the area of the camber 3, it has a flat section 7', which is an advantageous support for the camber 3 with its wave crests and wave troughs.

In the gasket according to FIG. 23, the upper gasket layer corresponds to an inversion of the corresponding gasket layer of FIG. 22, the lower layer 2' corresponds to an inversion of the lower gasket layer of FIG. 21.

FIGS. 24 to 26 show metallic flat gaskets, in which the camber 3 of the first gasket layer 2 faces a bead 6' in the second gasket layer 2'. The crest of the cambers 3 in all three cases point to the crest of the bead 6'. In the gaskets according to FIGS. 24 and 25, beads 6' with trapezoidal cross section are used while the bead 6' in FIG. 26 is rounded with an arch-shaped cross section. In the gasket according to FIG. 25, a further sealing element is provided in each gasket layer. In the first gasket layer 2 the camber 3 is followed by a bead 6 with a trapezoidal cross section. Opposite to it is a camber 3', the crest of which points to the crest of the bead 6.

FIGS. 27 and 28 show examples of three-layered metallic flat gaskets according to the invention. Both other gasket layers according to FIG. 27 in general correspond to the ones of FIG. 26, but they are arranged with inverse orientation. A further gasket layer 2", which is mainly flat, is arranged between these gasket layers. Only adjacent to the flat section 7" between the camber 3 and the bead 6' in the outer layers 2, 2', a cranking 61" is present in gasket layer 2". The cranking 61" provides for a symmetric effect of the higher camber 3 and the smaller bead 6'.

Both outer gasket layers of the gasket according to FIG. 28 are mirror symmetrical to each other and each comprise a camber 3 (or 3') as their sealing element for the combustion gas opening. Between these gasket layers, a further gasket layer 2" is laminated which is completely flat.

FIGS. 29 to 31 show examples of two-layered metallic flat gaskets, in which one of the two gasket layers is shortened relative to the other. Such shortened gasket layers are often referred to as "shims". With such a shim, the sealing element is most often situated in the main load connection. The shortened gasket layer may consist of a ring only which circumvents the combustion gas opening 5. The rings that encircle the combustion gas openings 5 may be connected to each other, so that a spectacle-shaped, shortened gasket layer results. In all three cases the combustion gas opening 5 is surrounded by a camber 3 with undulating structure and an arch-shaped bead 6', with both elements facing each other in opposite gasket layers. While the bead 6' and the camber 3 in the embodiments of FIGS. 29 and 30 point away from each other, they point towards each other in FIG. 31, so that their concave sides are positioned on the outsides of the gasket. In the gasket according to FIGS. 29 and 31, the gasket layer 2' containing the bead 6' is the shortened layer. In case of FIG. 30, the gasket layer 2 with the camber 3 is shortened. In the backland of the respective gasket, towards the outer edge of the gasket, both gaskets of FIGS. 29 and 30 show further undulating structures 8, 8', 80 and 80', respectively. These undulating embossings 8, 8' and 80, 80' mainly serve to deliberately thicken gasket areas.

Now, some exemplary dimensions for cambers provided with the undulating structure are given. The references for the following table are given in FIG. 32. This figure is comparable to FIGS. 4 to 7 and does not need to be explained further. It is also reverted to statements made in the context of FIGS. 6 and 7. The values refer to cylinder head gaskets, in which the camber with the undulating structure is used as the only sealing element for a combustion chamber opening. The table is divided into values for engines for passenger cars (PC) and utility vehicles (UV). For both classes of engines, generally useful as well as preferred areas are given. The values can also be considered when designing gaskets according to the invention for other applications.

TABLE 1

| reference number | measurand | PC general | PC preferred | UV general | UV preferred |
|---|---|---|---|---|---|
| d | Original layer thickness/mm | 0.10-0.40 | 0.20-0.30 | 0.20-0.60 | 0.30-0.50 |
| a | Thickening due to undulating structure/mm | 0.03-0.20 | 0.05-0.12 | 0.05-0.30 | 0.05-0.25 |
| c | Thinning/mm | 0.03-0.20 | 0.05-0.12 | 0.05-0.30 | 0.05-0.25 |
| Ro | Upper radius/mm | 0.10-0.30 | 0.10-0.20 | 0.10-0.40 | 0.10-0.30 |
| Ru | Lower radius/mm | 0.10-0.30 | 0.10-0.20 | 0.10-0.40 | 0.10-0.30 |
| Rü | Transition radius/mm | 0.0-0.40 | 0.10-0.20 | 0.0-0.40 | 0.10-0.20 |
| B | Width of arch (Camber)/mm | 1.5-4.0 | 1.5-3.0 | 1.5-5.0 | 2.0-4.0 |
| H | Height of arch (Camber)/mm | 0.05-0.8 | 0.1-0.50 | 0.10-1.0 | 0.20-0.70 |
|   | Number of waves | 2-12 | 2-6 | 2-12 | 2-6 |

TABLE 1-continued

| reference number | measurand | PC general | PC preferred | UV general | UV preferred |
|---|---|---|---|---|---|
| h/f | Degree of flange tapering | 0.65-0.95 | 0.70-0.90 | 0.60-0.95 | 0.70-0.90 |
| (a/H) | Ratio thickness of wave/height of camber | 0.1-0.8 | 0.2-0.5 | 0.1-0.8 | 0.2-0.5 |

"Thickening" means the absolute increase of the material thickness compared to the original thickness of the gasket layer (metal sheet thickness d) as a consequence of the embossment of the undulating structure. This measurand is measured as the distance between two linking lines which consist of straight linear sections, which link the maxima of the wave crests on both surfaces 21 and 22 of the gasket layer with each other in the same way as the linking lines V1 V2 link the minima of the wave troughs in FIG. 7. "Thinning" means the reduced layer thickness of the gasket layer in the wave troughs. It results from the lengthening that happens during the embossment of the undulating structure and can be measured as the distance c between the linking curves V1 and V2 in FIG. 7.

FIG. 33 demonstrates the use of the sealing element 3 according to the invention for a space-saving sealing of engines, in which liners LB are inserted into the engine block MB against the cylinder head ZK. The gap between the engine block MB and the liner LB is bridged by the camber 3. Both slope areas 32 and 32* allow for a compensation of movements of engine block MB and liner LB relative to each other, so that at least the foot points of the camber come to lie on the engine block and liner, respectively, while the crest point 31 abuts to the cylinder head ZK.

Figure 34:
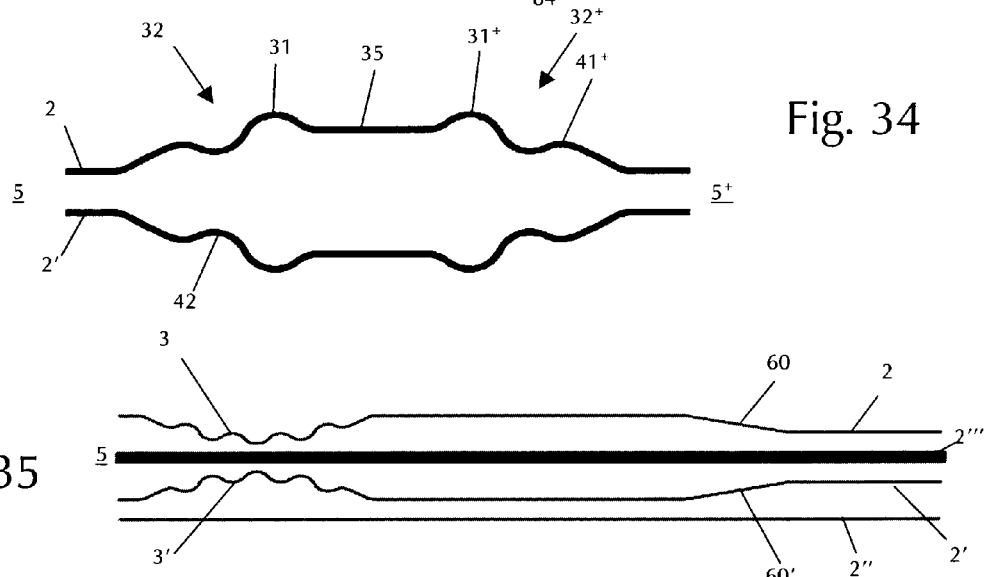
FIG. 34 a further example of a two-layered metallic flat gasket according to the invention in a partial sectional view along line Z'-Z' in FIG. 1

FIG. 34 depicts the narrow web area between two neighbouring combustion chamber openings 5 in a—in the example two-layered—cylinder head gasket. The figure corresponds to the section Z'-Z' in FIG. 1. The slope areas 32 and 32$^+$ of the adjacent openings 5 and 5$^+$ run in parallel through the web area and form a small web plateau 35 in the cross section shown. The slope areas 32 and 32$^+$ each show two wave crests and wave troughs.

Figure 35:
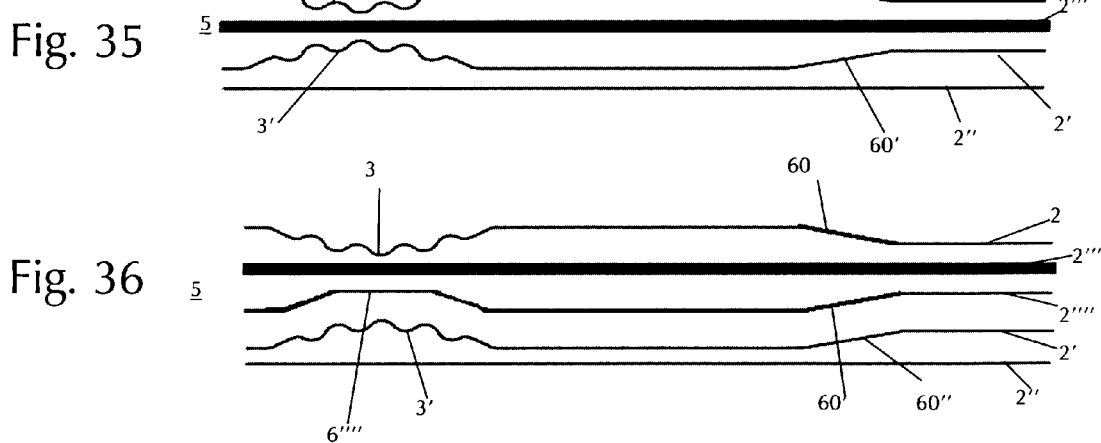
FIG. 35 a partial sectional view through an example of a four-layered gasket according to the state of the art.
Figure 36:
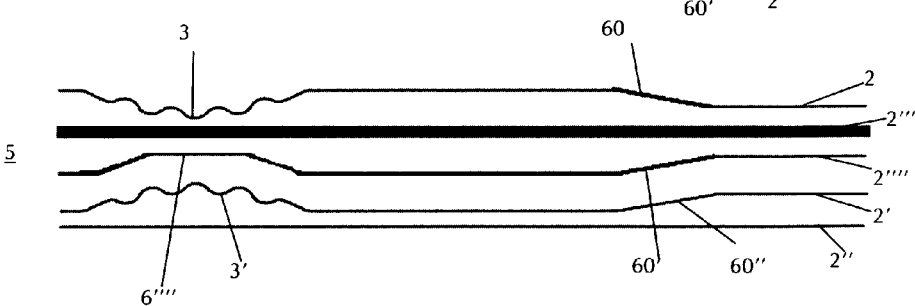
FIG. 36 a partial sectional view through an example of a five-layered gasket according to the state of the art.

FIGS. 35 and 36 show exemplary four and five-layered metallic gaskets according to the invention. FIG. 35 shows two gasket layers 2, 2', which both show cambers 3, 3' in the area of the through opening 5 as well as half beads 60, 60' near the outer edge. Both layers are arranged mirror symmetric with respect to each other around a further gasket layer 2''', which is a flat metal sheet that with its increased thickness mainly serves to properly adjust the thickness of the gasket. Further, the gasket comprises a further flat metal sheet 2'', which can be advantageous for sealing cooling water channels in the engine block. The embodiment according to FIG. 36 compared to the one of FIG. 35 is modified by adding a further gasket layer 2'''', which is provided with a bead 6'''' in the area close to the through opening 5. Other than in the preceding examples, the concave side of this bead 6'''' does not point to the concave side of the camber 3'', but to the convex side of the latter. This arrangement can be advantageous if the forces of the sealing elements are to mutually reinforce themselves using a serial connection. This can also be applied in gaskets with fewer layers.

Figure 37:
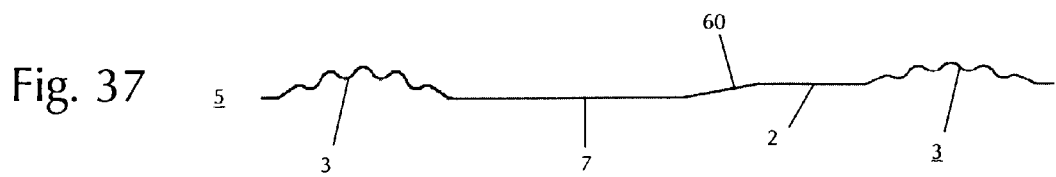
FIG. 37 a further example of a one-layered metallic flat gasket according to the state of the art in a sectional view along line Y'-Y' in FIG. 1.

FIG. 37 shows a sectional view along line Y'-Y' in FIG. 1 on the example of a one-layered gasket. The combustion chamber opening is sealed with a camber according to the invention; spaced by a flat section, a half bead 60 is provided to seal the cooling water holes 52 towards the outer edge of the gasket. Between this half bead 60 and the outer edge, an additional camber 3 according to the invention is embossed, which points to the same direction as the camber 3 next to the combustion chamber. The half bead 60 causes an offset of the camber 3 relative to the camber 3. Moreover, the camber 3 has a smaller height than the camber 3.

Figure 38:
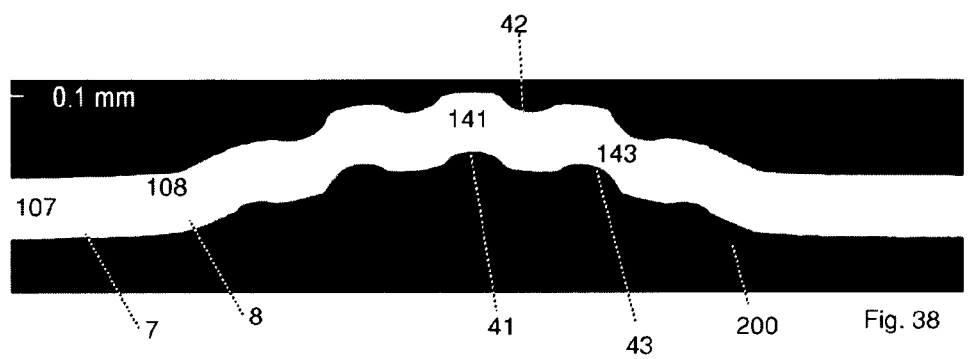
FIG. 38 a picture of a section through a gasket layer showing the camber with the undulating structure.
Figure 39:
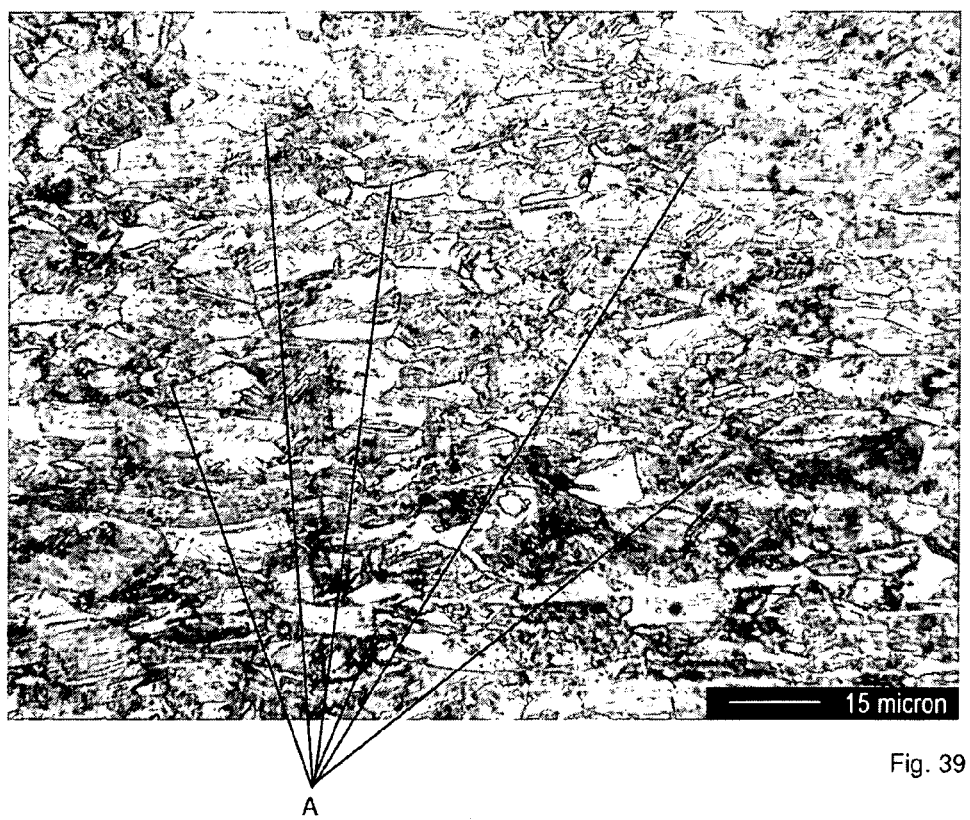
FIG. 39 a microscopic picture of a section through a gasket layer in the area 7 of FIG. 38.

FIGS. 38 to 42 indicate how the regular pressure distribution in the gasket according to the invention is based on microstructural properties. FIG. 38 illustrates the positions at which the microscopic pictures of etched sections through the gasket layers have been taken. Reference number 200 indicates the resin into which the gasket layer has been embedded before the section was made. FIG. 39 is taken in the flat area 7 of the gasket and shows a section 107 with an austenitic microstructure A all over the section 107. Since the flat area 7 is unaffected by the embossment of the camber, this area 7 and the section 107 is also representative for the sheet metal sheet material in its state before the embossment.

Figure 40:
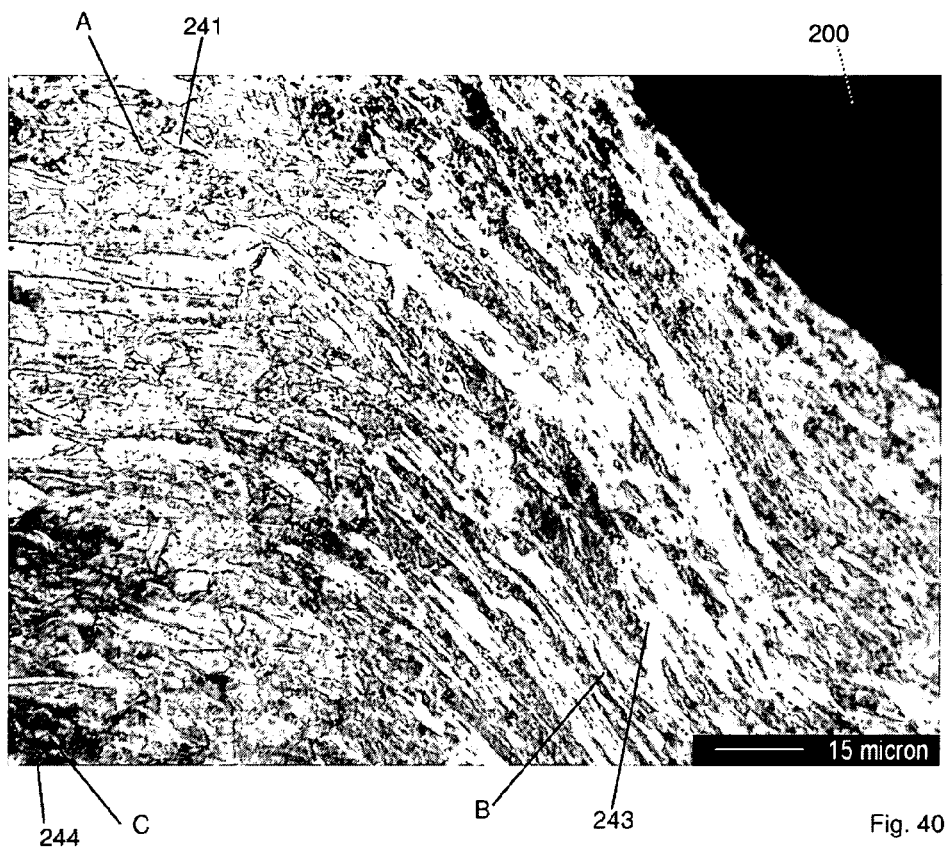
FIG. 40 a microscopic picture of a section through a gasket layer in the area 41 of FIG. 38.

FIG. 40 represents a flank area 43 of an undulating structure, thus the transition region between a wave crest 41 and a wave trough 42. From FIG. 38, it is obvious that this flank area 43 has a reduced thickness compared to the wave crest 41 and the wave trough 42, respectively. This flank tapering is one of the reasons for the regular pressure distribution over the camber 3. Another reason follows from the microscopic picture of section 143 given in FIG. 40. In contrast to the illustration of FIG. 39, here, different zones can be identified. While in the region 241 that points towards the wave crest 41, the microstructure A is present as it is for the unaltered area 7, both the regions of the tapered flank 243 and the region next to the lower surface of the wave crest 244 show deviating microstructures B and C. Microstructure C contains strain-induced martensite and results from pressing and moving the material at the last stage before the die is completely closed. As can be seen in FIG. 40, this hardened material is present in an extreme small quantity only. In contrast, microstructure B extends over most of the area of the flank area, namely in region 243. While austenitic microstructure A shows relatively large grains, microstructure B shows a stretched texture with elongated structures. This microstructure B is typical for a grain refinement, a process that increases both the yield strength and the ductility of the material. The increase of both of these properties causes the extremely regular pressure distribution in the camber 3 with the undulating structure. Moreover, the material is much less susceptible to cracks than a material without the grain refinement. The microstructural observations indicate that the embossment process in the flank area 43 is dominated by shearing strain.

Figure 41:
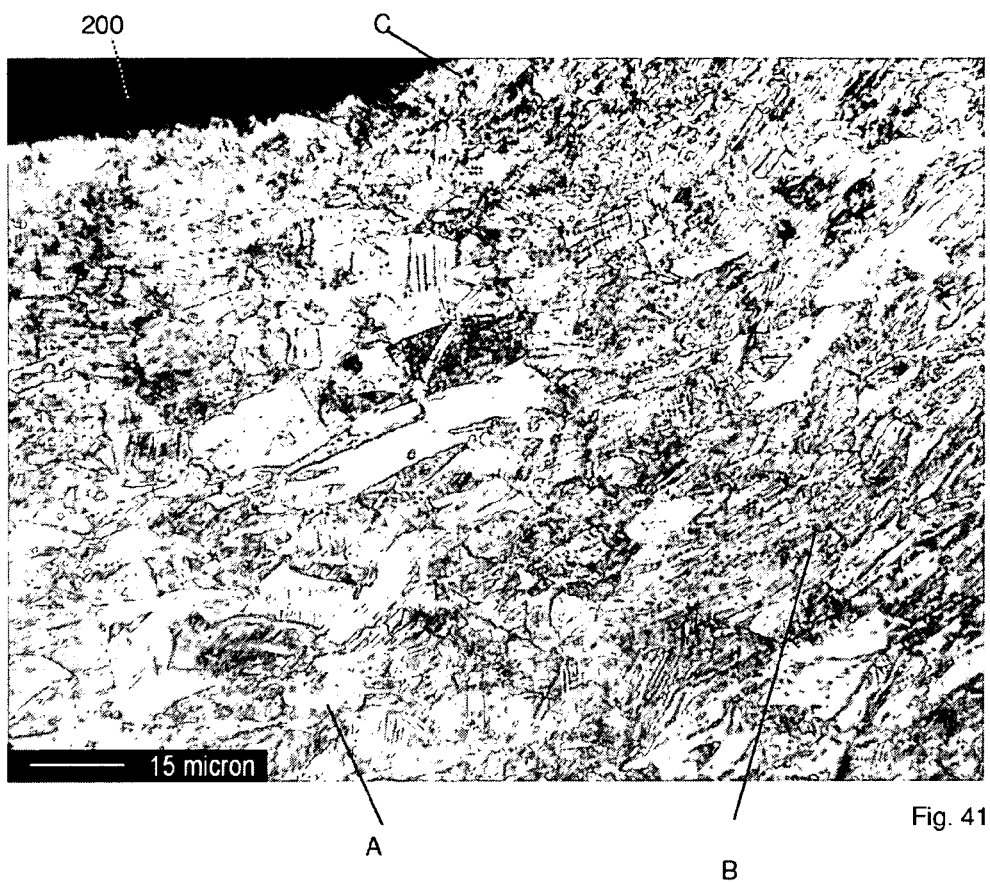
FIG. 41 a microscopic picture of a section through a gasket layer in the area 8 of FIG. 38.
Figure 42:
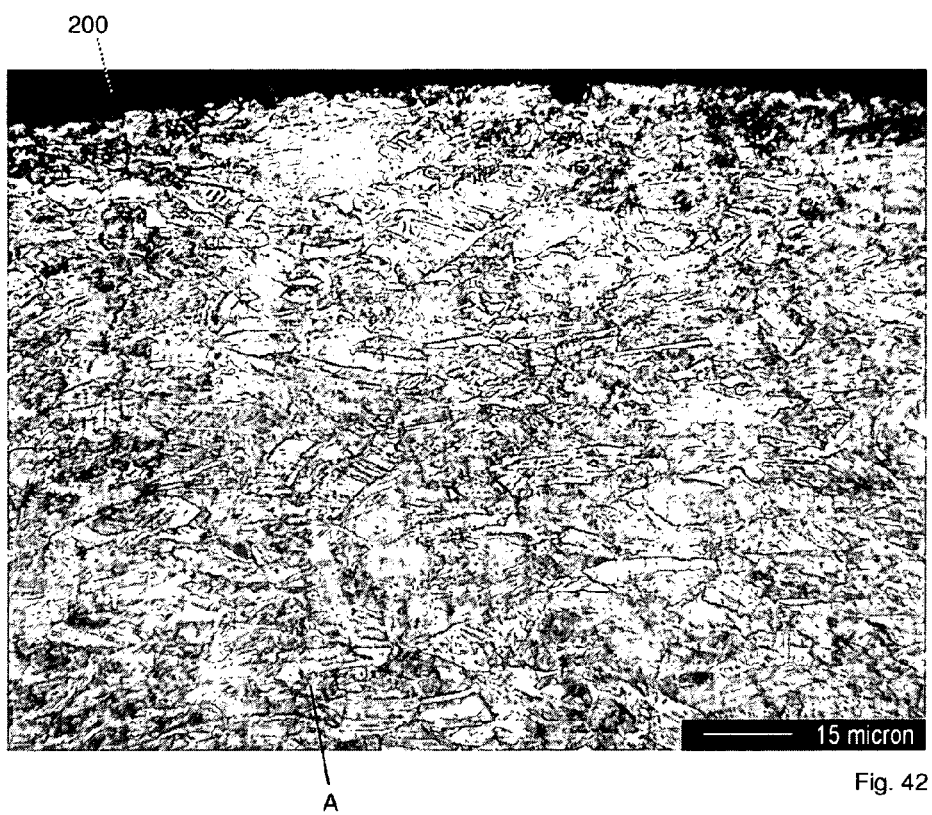
FIG. 42 a microscopic picture of a section through a gasket layer in the area 43 of FIG. 38.

FIG. 41 represents the area close to a foot point of the camber. However, in the section depicted, the slope area of the camber already ascends. Again, three different microstructures can be identified: The largest part of the section shows an unmodified austenitic microstructure A, the upper surface of the ascending slope shows a thin area in which a martensitic region C is formed. On the right hand side, where the camber and the first wave crest significantly ascend (as can be seen from the border to the resin 200), a grain refinement B is present. In FIG. 42, which represents a section 141 through the crest area 41, the microstructure is most similar to the austenitic microstructure A of the original or untreated material in the flat area 7. This corresponds with the observation made in FIG. 40. Thus, the grain refinement only takes place in the flank areas 43 of the undulating structure.

These microstructural observations are underlined by some hardness measurements, which were taken at the center line ML at positions 7, 8, 41 and 43, respectively. While the Vickers hardness is quite similar in the flat area 7 and the region 8 next to the foot point, namely 465 and 480, respectively, it is slightly higher, 518, in the crest region but considerably higher in the flank area 43 between wave crest and wave trough, where an average value of 609 was measured.

The invention claimed is:

1. A metallic flat gasket with at least one metallic gasket layer, which is mainly flat and shows a first and second surface, wherein a plane of the gasket runs centered between said flat areas, wherein a camber is formed within the gasket layer, which protrudes over the first surface of the gasket layer and which has a larger length than width, wherein the camber possesses a first level given by a virtual level, which runs in parallel to the plane of the gasket through a foot of the camber on the first surface of the gasket layer and a second level, given by a further virtual level, which runs through the highest point of the camber and also parallel to the plane of the gasket of the gasket layer, wherein the camber possesses a slope area that ascends between the two levels, comprising:
the slope area is provided with an undulating structure such that it comprises at least two waves in the direction between the two levels each with a wave crest and a wave trough;
wherein in the area of the undulating structure the thickness of the gasket layer in the area of the flanks between the wave crests and wave troughs is reduced by 5 to 40%, relative to the thickness of the gasket layer in the area of the wave crests or wave troughs.

2. The metallic flat gasket according to claim 1, wherein the camber extends at least in sections.

3. The metallic flat gasket according to claim 2, wherein the camber is selected from the group consisting of:
a) a full bead with two feet of the bead and two slope areas ascending between the feet of the bead and the crest of the bead or
b) a half bead with only one foot of the bead and only one slope area.

4. The metallic flat gasket according to claim 3, wherein the slope area steadily rises from the first level to the second level, and where an envelope curve connecting the crest points of the wave crests and/or the minima of the wave crests preferably is shaped as a circular arc or elliptic.

5. The metallic flat gasket according to claim 4, wherein the difference of the heights, with which the crest points of two adjacent wave crests protrude beyond the first level, decreases in the direction of the crest point of the camber.

6. The metallic flat gasket according to claim 5, wherein the wave crests and the wave troughs in a widthways cross section of the camber have a sinus-shaped course or each a trapezoidal cross-sectional profile.

7. The metallic flat gasket according to claim 2, wherein the camber extends in a closed circular manner around a through opening in the gasket layer.

8. The metallic flat gasket according to claim 1, wherein in the area of the undulating structure the thickness of the gasket layer in the area of the flanks between the wave crests and wave troughs is reduced by 10 to 30%, relative to the thickness of the gasket layer in the area of the wave crests or wave troughs.

9. The metallic flat gasket according to claim 1, wherein the undulating structure extends along the complete width of the camber and/or its complete length.

10. The metallic flat gasket according to claim 1, wherein the undulating structure does not extend along the complete width of the camber, especially with a plateau between the two slope areas that contain the undulating structure.

11. The metallic flat gasket according to 10, wherein the camber all in all shows an arch-shaped or trapezoidal cross-sectional profile.

12. The metallic flat gasket according to claim 11, wherein the undulating structure within the camber is formed in such a way that a center line, which in a widthways cross section extends at half material thickness through the camber, does not intersect with any of the following lines in the same cross section:
a first linking line, which is composed of straight linear sections that link the minima of adjacent wave troughs on the first surface of the gasket layer with each other, and
a second linking line, which is composed of straight linear sections that link the minima of adjacent wave troughs on the second surface of the gasket layer with each other.

13. The metallic flat gasket according to claim 12, wherein the Vickers hardness in the flank area is at least 10% higher than in the flat area of the gasket layer.

14. The metallic flat gasket according to claim 13, wherein a grain refinement is present in the flank area of the undulating structure, and where preferably the grain structure is unaltered in the crest region with the exception of the 10% material thickness next to the surface.

15. The metallic flat gasket according to claim 14, wherein the camber is the only sealing element that encircles the through opening.

16. The metallic flat gasket according to claim 15, wherein in addition to the camber, a further sealing element, especially in the form of a bead that encircles the through opening, is provided for the sealing of the through opening.

17. The metallic flat gasket according to claim 16, wherein it comprises at least two gasket layers, at least one of which comprises a camber with an undulating structure.

18. The metallic flat gasket according to claim 17, wherein in the further gasket layer, one of the following elements faces the camber with the undulating structure:
a camber with an undulating structure, especially a camber that is arranged mirror-symmetric to the camber in the first gasket layer;
a bead or a half bead, especially a bead or half bead that is oriented essentially mirror-symmetric to the camber in the first gasket layer;
a flat section of the further gasket layer.

19. The metallic flat gasket according to claim 18, wherein the flat gasket is a cylinder head gasket, a high pressure gasket or an exhaust gas bearing gasket.

20. The metallic flat gasket according to claim 19, wherein said exhaust bearing gasket is an exhaust manifold gasket or a gasket in the area of the exhaust gas treatment.

21. The metallic flat gasket according to claim 12, wherein the Vickers hardness in the flank area is at least 15% higher than in the flat area of the gasket layer.

22. The metallic flat gasket according to claim 1, wherein said gasket seals between a cylinder head and an engine block with liner(s), wherein the camber bridges the gap between the engine block and the liner.

23. A metallic flat gasket with at least one metallic gasket layer, which is mainly flat and shows a first and second surface, wherein a plane of the gasket runs centered between said flat areas, wherein a camber is formed within the gasket layer, which protrudes over the first surface of the gasket layer and which has a larger length than width, wherein the camber possesses a first level given by a virtual level, which runs in parallel to the plane of the gasket through a foot of the camber on the first surface of the gasket layer and a second level, given by a further virtual level, which runs through the highest point of the camber and also parallel to the plane of the gasket of the gasket layer, wherein the camber possesses a slope area that ascends between the two levels, comprising:
- the slope area is provided with an undulating structure such that it comprises at least two waves in the direction between the two levels each with a wave crest and a wave trough;
- wherein the difference of the heights, with which the crest points of two adjacent wave crests protrude beyond the first level, decreases in the direction of the crest point of the camber.

24. The metallic flat gasket according to claim 23, wherein said gasket seals between a cylinder head and an engine block with liner(s), wherein the camber bridges the gap between the engine block and the liner.

\* \* \* \* \*